United States Patent [19]
Kakii et al.

[11] Patent Number: 5,268,986
[45] Date of Patent: Dec. 7, 1993

[54] REDUNDANT LENGTH TREATMENT MECHANISM FOR OPTICAL FIBER AT TERMINAL OF OPTICAL CABLE

[75] Inventors: Toshiaki Kakii; Hidetoshi Ishida; Tomohiko Ueda; Kyoji Maruyama, all of Yokohama; Tadashi Haibara; Shigeru Tomita, both of Mito, all of Japan

[73] Assignees: Sumitomo Electric Industries, Ltd., Osaka; Nippon Telegraph and Telephone Corporation, Tokyo, both of Japan

[21] Appl. No.: 940,221

[22] Filed: Sep. 3, 1992

[30] Foreign Application Priority Data

| Sep. 9, 1991 | [JP] | Japan | 3-229127 |
| Nov. 22, 1991 | [JP] | Japan | 3-307750 |
| Aug. 5, 1992 | [JP] | Japan | 4-209161 |

[51] Int. Cl.$^5$ ............................................ G02B 6/44
[52] U.S. Cl. ............................................ 385/135
[58] Field of Search ............................ 385/135, 114

[56] References Cited

U.S. PATENT DOCUMENTS

| 4,820,007 | 4/1989 | Ross et al. | 385/135 |
| 5,042,901 | 8/1991 | Merriken et al. | 385/135 |
| 5,093,886 | 3/1992 | Smoker et al. | 385/135 |
| 5,097,529 | 3/1992 | Cobb et al. | 385/135 |
| 5,142,661 | 8/1992 | Grant et al. | 385/135 |

OTHER PUBLICATIONS

Haibara et al., "High-Speed, Low-Loss Connection Techniques for High-Count Pre-Connectorized Cables", International Wire & Cable Symposium Proceedings 1991, pp. 296–302.

"Optical Fiber Cable Jointing With Mechanical Sheath Closure MJC-FV", Sumitomo Electric Industries, Ltd.

*Primary Examiner*—Frank Gonzalez
*Attorney, Agent, or Firm*—Cushman, Darby & Cushman

[57] ABSTRACT

A redundant length treatment mechanism for an optical fiber which is stored in an optical cable and has one end connected to an optical connector, includes a storage case in which a redundant part of the optical fiber exposed from the optical cable is stored while wound up in a loop form, a bent form or an S-shape form, the storage case having a draw-out portion through which one end portion of the looped optical fiber is drawn out, and curvature restricting means comprising a pair of stoppers secured to the optical fiber for restricting radius of curvature of the optical fiber stored in a loop form in the storage case.

22 Claims, 13 Drawing Sheets

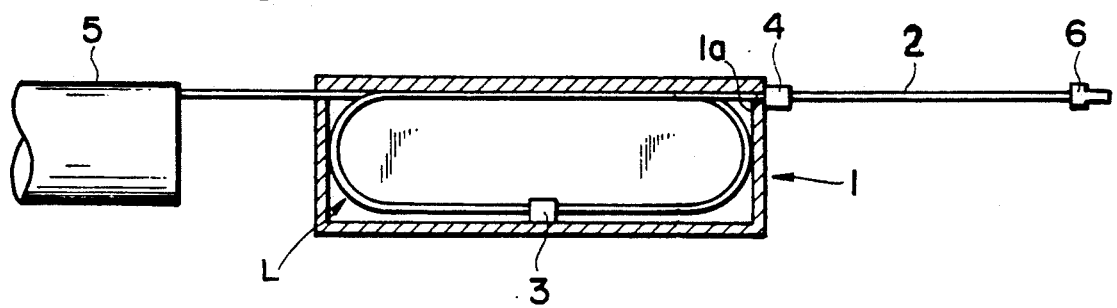
Fig. IA
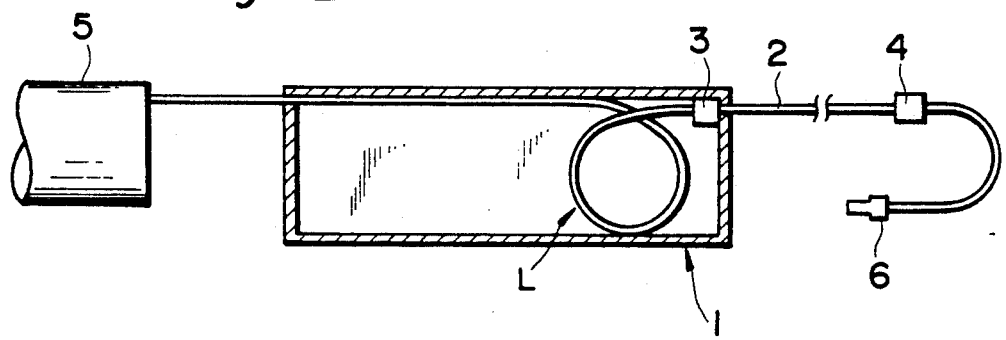
Fig. IB
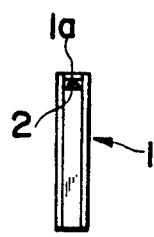
Fig. IC

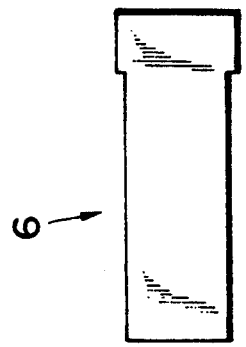
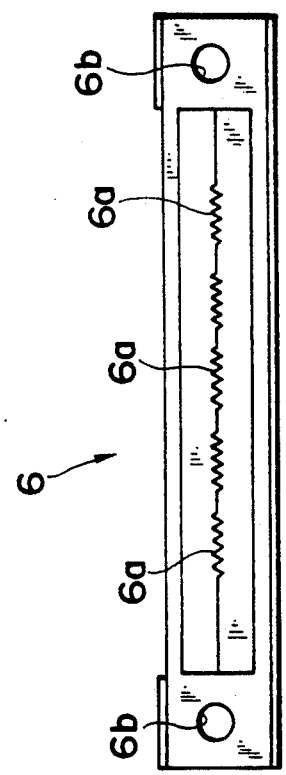

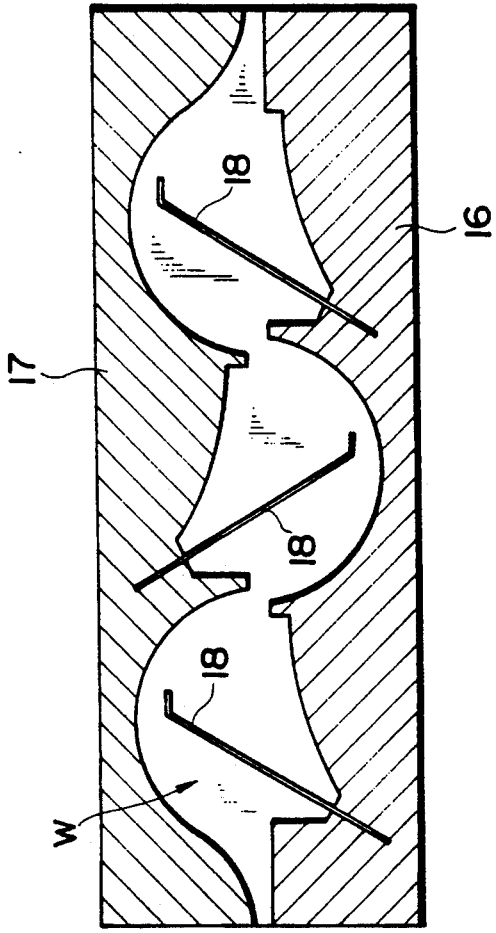

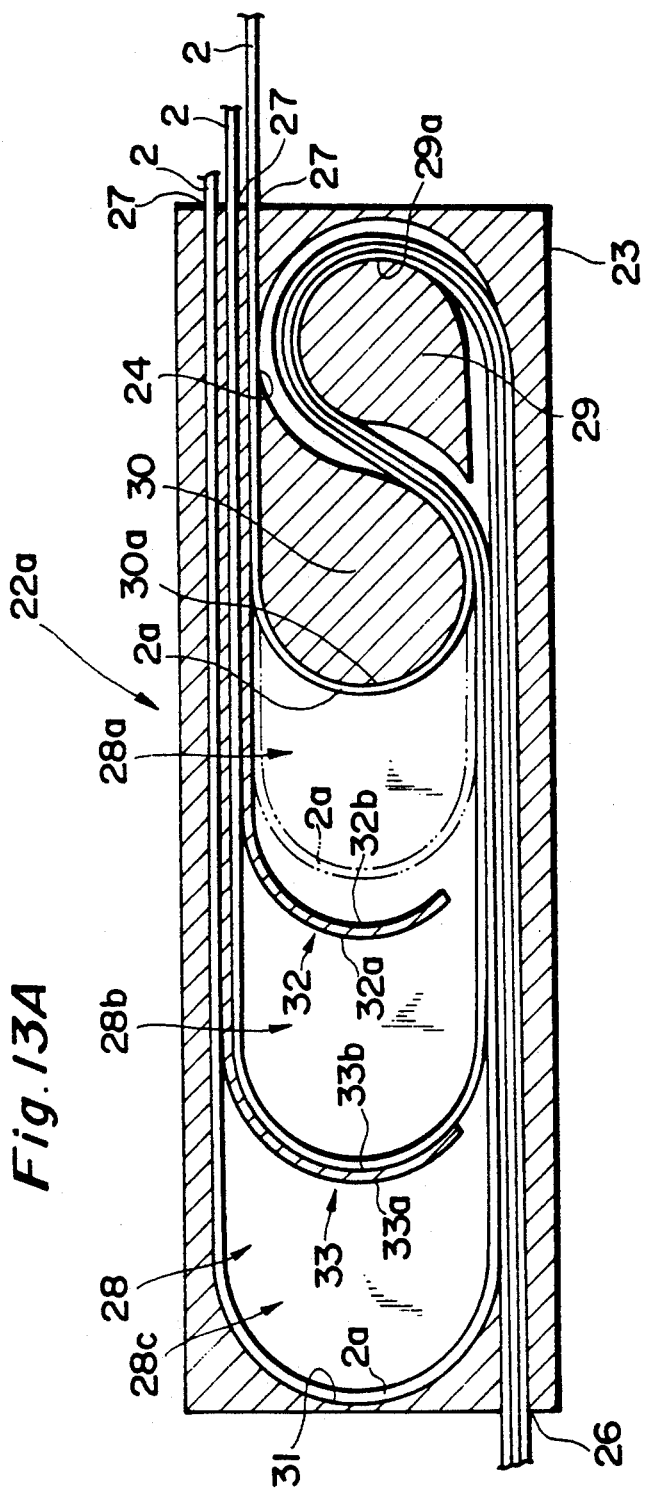

REDUNDANT LENGTH TREATMENT MECHANISM FOR OPTICAL FIBER AT TERMINAL OF OPTICAL CABLE

BACKGROUND OF THE INVENTION

1. Field of the Invention

This invention relates to a redundant length treatment mechanism for an optical fiber which is enclosed in an optical cable and whose end portion is connected to an optical connector.

2. Related Background Art

In a case where plural optical fibers enclosed in two optical cables located so as to be confronted to each other are required to be connected to one another through optical connectors, the connection between the optical fibers in the optical cables would be impossible if the length of each optical fiber between the end of the optical cable and the end of the optical fiber core is extremely short, and this obstructs a connection work of the respective optical fiber cores of the two optical cables.

In order to avoid this obstruction, the optical fiber is designed to be superfluously extended or exposed from the end of the optical cable to the outside, and this redundant part of the optical fiber is beforehand wound around an external reel. That is, the optical fiber core is designed so as to have a redundant length and assure the minimum bend radius thereof.

However, a conventional technique requires an additive working for winding around an external reel the redundant part of the optical fiber which is superfluously extended or exposed from the optical cable enclosing the optical fiber to the outside, and thus the working efficiency of the conventional technique has been low.

SUMMARY OF THE INVENTION

An object of this invention is to provide a redundant length treatment mechanism for an optical fiber in which the optical fiber is drawn or fed out from the end of an optical cable by a desired amount or length by freely adjusting the redundant length (the length of a redundant part) of the optical fiber to thereby improve the working efficiency of the connection work of optical connectors.

In order to achieve the above object, according to the first aspect of this invention, a redundant length treatment mechanism for an optical fiber which is enclosed in an optical cable and whose end portion is connected to an optical connector, includes a storage case in which a redundant part of an optical fiber exposed from the end of the optical cable to the outside is stored while wound up in a loop-shaped form and from which the end portion of the loop-formed redundant part is drawn out to the outside, and curvature restricting means for setting or restricting the radius of curvature of the loop-shaped optical fiber.

The redundant length treatment mechanism according to the second aspect of this invention includes fiber bending means for bending the optical fiber exposed from the optical cable on the substantially same plane, and support means for supporting the optical fiber while holding the optical fiber in a bent state.

Further, according to the third aspect of this invention, the redundant length treatment mechanism of this invention includes a storage case in which the optical fiber exposed from the optical cable is stored while bent in a substantially S-shaped form and from which the end portion of the optical fiber is drawn out, fiber bending means for bending back the optical fiber in a substantially S-shaped form on the same plane as the optical fiber, and redundant length adjusting means for adjusting the bend-back length of the optical fiber bent in the S-shaped form.

According to the redundant length treatment mechanism of the first aspect of this invention, the optical fiber is stored in a loop-shaped form in the storage case, so that the optical fiber is wound up in the storage case as the radius of curvature of the loop is increased, and is drawn or fed out from the storage case as the radius of curvature of the loop is reduced. Therefore, the redundant length of the optical fiber is adjustable in accordance with the variation of the radius of curvature of the loop.

Further, according to the redundant length treatment mechanism of the second aspect of this invention, the optical fiber is supported in a bent state on the same plane in the storage case, so that the radius of curvature of the optical fiber stored in the bent state is reduced when the optical fiber is drawn out and increased when the optical fiber is slackened. In addition, the optical fibers can be arranged on the same plane while not intersected to one another, and thus the width and length in directions vertical to the plane can be reduced to their minimum values.

Still further, according to the redundant length mechanism of the third aspect of this invention, the bent portion of the optical fiber is stored in the storage case while bent in an S-shaped form, and its end portion is drawn out from the storage case. A bent portion of the S-shaped part of the optical fiber is freely movably provided in the bend-back length adjusting means inside of the storage case, so that the redundant length of the optical fiber is freely adjustable in accordance with displacement of the bent portion in the bend-back length adjusting portion which is carried out in accordance with the draw-out and retracting operation of the optical fiber from and into the storage case.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

FIGS. 1A-1C are schematics diagram of a first embodiment of a redundant length treatment mechanism for an optical fiber according to this invention;

FIGS. 2A and 2B show an embodiment of an optical connector which can be used in this embodiment;

FIGS. 8A and 8B show a third embodiment of the redundant length treatment mechanism according to this invention;

FIGS. 13A and 13B show an eighth embodiment of the redundant length treatment mechanism according to this invention.

DESCRIPTION OF THE PREFERRED EMBODIMENT

Figure 3A:
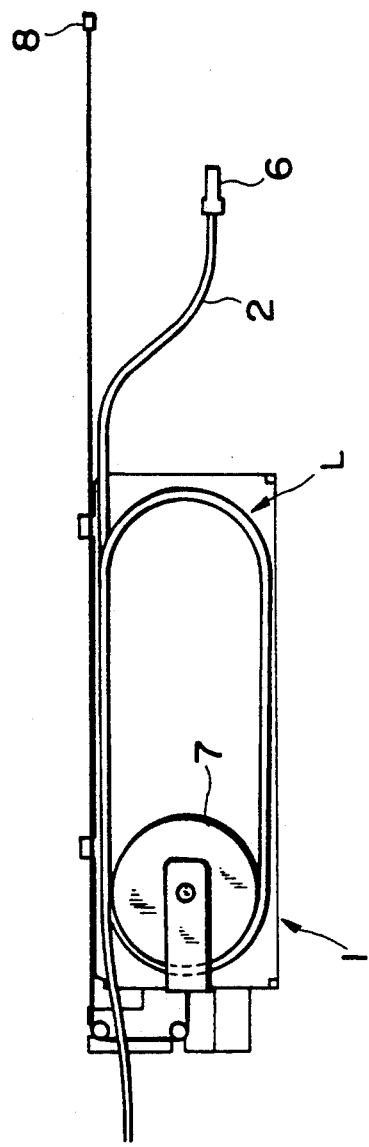
FIGS. 3A and 3B are schematic diagrams of a second embodiment of the redundant length treatment mechanism according to this invention.

First to eighth embodiments according to this invention will be described hereunder with reference to the accompanying drawings. In the following embodiments, the same elements are represented by the same reference numerals, and the repetitive description on the same elements is eliminated.

FIGS. 1A-1C and 2A-2B show a first embodiment of the redundant length treatment mechanism of an optical fiber according to this invention. FIG. 1A is a longitudinal-sectional view of the redundant length treatment mechanism of this embodiment in which the optical fiber is stored at its maximum length in the storage case, and FIG. 1B is a longitudinal-sectional view of the redundant length treatment mechanism in which the optical fiber is drawn or fed out at its maximum length from the storage case.

The redundant length treatment mechanism of this embodiment includes a storage case 1 and stoppers 3 and 4 which are fixedly secured to an optical fiber unit 2 at two positions. The optical fiber unit 2 is constructed by plural ribbon fibers laminated in an assembled-state, for example. The optical fiber unit 2 is drawn or fed out from the optical cable 5 comprising a slot-type of high-density ribbon cable. The optical fiber unit 2 exposed from the optical cable 5 is guided to the storage case 1, and spirally wound up in the storage case, so that a loop L having arcuate portions is formed in the storage case 1. After the loop L is formed, the end portion of the optical fiber unit 2 is inserted into a draw-out port 1a of the storage case 1 and guided therethrough to the outside. The end portion of the optical fiber unit 2 which is drawn out to the outside is connected to an optical connector 6.

FIGS. 2A-2B show a lateral-arrangement type of optical connector in which 40 cores are laterally arranged on a row and which can be used for the present embodiment. FIG. 2A is a front view of the optical connector which is viewed from an incidence/emission end surface of the optical connector, and FIG. 2B is a side view of the optical connector. The optical connector includes ribbon fibers 6a each comprising eight cores which are laterally connected to one another on a row, and guide pin insertion holes 6b formed at both sides thereof.

Since the optical fiber unit 2 is fed out from the optical cable 5 while plural ribbon fibers are laminated, it has sufficient rigidity and a substantially-circular or substantially-elliptical loop L is formed in the storage case 1. Therefore, the optical fiber unit 2 is prevented from being twisted or hitched in the storage case 1, and it can be smoothly drawn out or retracted into the storage case 1.

The stoppers 3 and 4 serving as curvature restricting means for setting or restricting the radius of curvature of the loop-shaped optical fiber unit 2 are secured to the two positions of the optical fiber unit 2 at the front and rear sides of the draw-out port 1a (inside and outside of the storage case 1). Each of the stoppers 3 and 4 is formed of a member having a larger size that the profile of the draw-out port 1a, so that each of the stoppers 3 and 4 is inhibited from being passed through the draw-out port 1a to the outside and the inside of the storage case 1, respectively. Therefore, the optical fiber unit 2 is provided with a redundant part whose length (redundant length) is variable in a range corresponding to a distance between the stoppers 3 and 4. The stopper 3 is secured to the optical fiber unit 2 at such a position that when the optical fiber unit 2 is drawn out from the storage case 1 at its maximum length (as shown in FIG. 1B), the optical fiber unit 2 is prevented from being damaged due to excessive reduction of the radius of the loop L of the optical fiber unit 2 in the storage case 1 which is caused by excessively drawing out the optical fiber unit 2 from the storage case 1, that is, at such a position that the permissible minimum radius of curvature is assured for the optical fiber unit 2. On the other hand, the stopper 4 is secured to the optical fiber unit 2 at such a position that when the optical fiber unit 2 is retracted into the storage case 1 at its maximum length (as shown in FIG. 1A), the optical fiber unit 2 is prevented from being damaged due to excessive increase of radius of the loop L of the optical fiber unit 2 in the storage case 1, that is, at such a position that the permissible maximum radius of curvature is assured for the optical fiber unit 2. These securing positions of the stoppers 3 and 4 can be easily calculated on the basis of the permissible minimum bend radius of the used optical fiber unit 2 and the length of the storage case 1.

According the redundant length treatment mechanism of this embodiment as described above, the optical fiber unit 2 can be simply drawn out from the storage case by a desired length for the connection work of the optical connector, and the redundant part of the optical fiber unit 2 can be simply retracted into the storage case 1 when the connection work is completed.

Figure 3B:
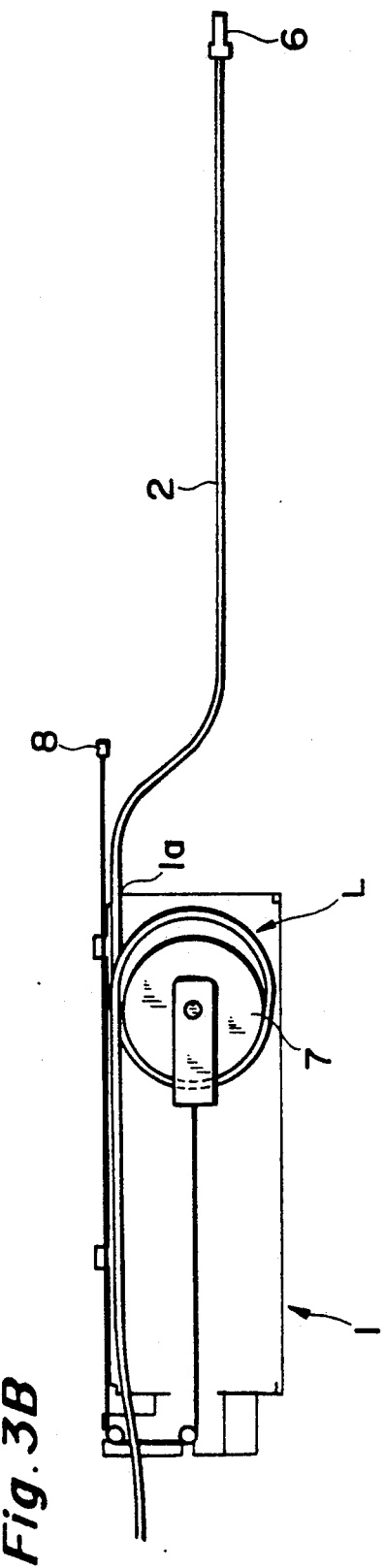

Next, a second embodiment of the redundant length treatment mechanism of this invention will be described with reference to FIGS. 3A and 3B. The redundant length treatment mechanism of this embodiment differs from the first embodiment in the point that a movable reel 7 is used as curvature restricting means for setting or restricting the radius of curvature of the optical fiber unit 2 stored in the storage case 1. The movable reel 7 comprises a circular reel having a larger radius than the permissible minimum radius of curvature of the optical fiber unit 2 at which the optical fiber unit 2 is not damaged, and it is provided in the storage case 1 so as to be movable in the storage case 1. The end portion of the movable reel 7 is connected through plural pulleys to a redundant length adjusting string 8 with which the movable reel 7 is moved in such a direction that the radius of curvature of the loop of the optical fiber unit 2 is increased.

According to the redundant length treatment mechanism of this embodiment as described above, when the optical fiber unit 2 in a state where it is drawn out from the storage case 1 at its maximum length (FIG. 3B) is required to be retracted into the storage case 1, the optical fiber unit 2 can be retracted into the storage case 1 for a short time by merely drawing out the redundant length adjusting string 8.

Figure 4:
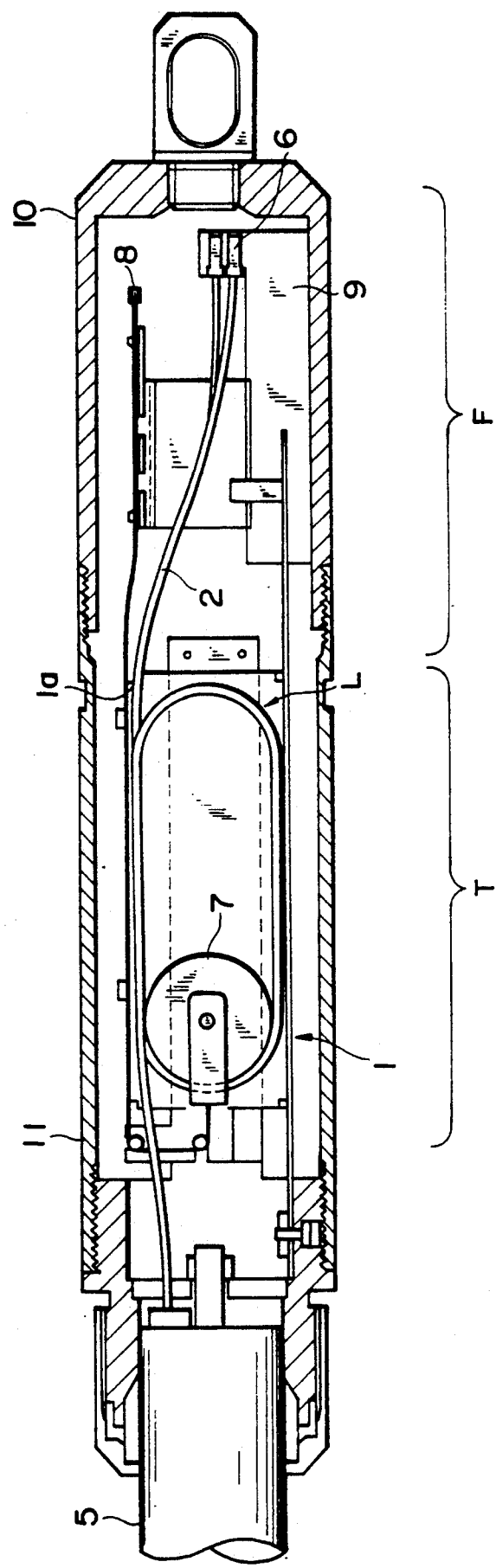
FIG. 4 is a longitudinal-sectional view of a cable coupling structure, which is taken along a plane on which a movable reel is moved, the redundant length treatment mechanism of the second embodiment being applied to the cable coupling structure.
Figure 5:
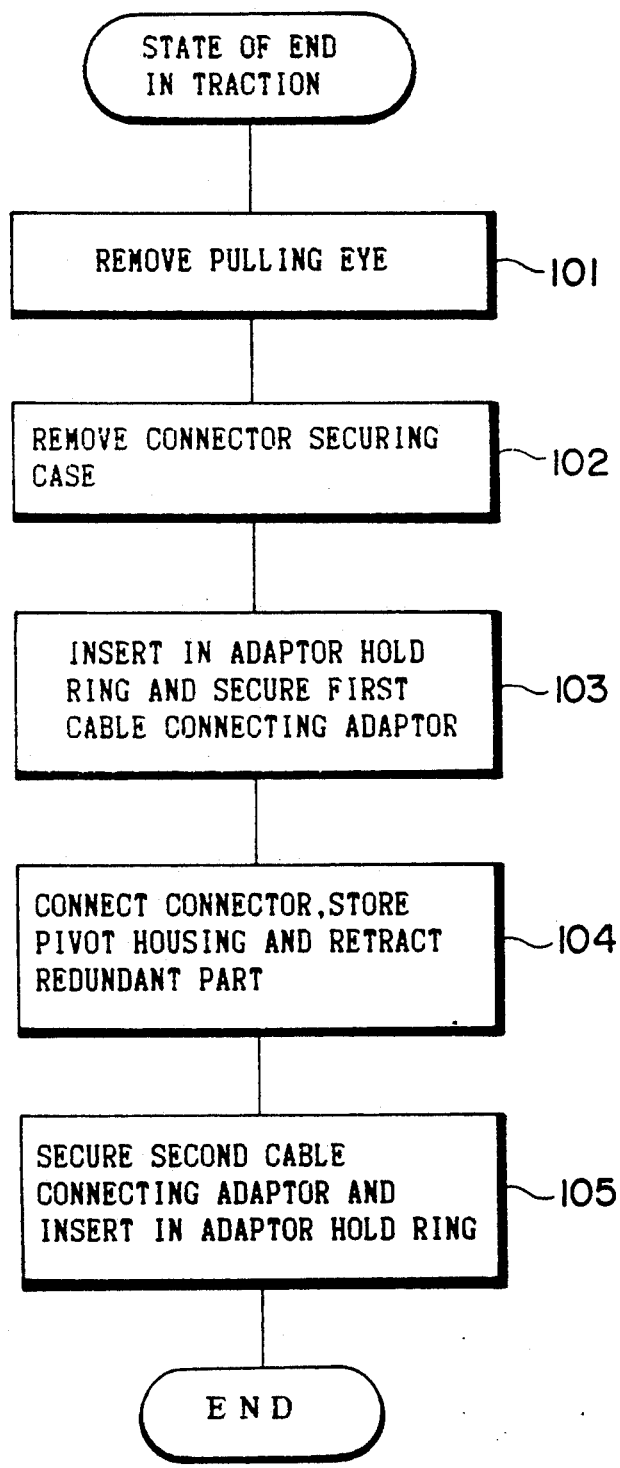
FIG. 5 is a flowchart for a connection work of the optical connector with the cable coupling structure to which this invention is applied.

Next, a cable coupling structure to which the second embodiment of the redundant length treatment mechanism of this invention is applied concretely, will be explained in reference with FIG. 4.

The cable coupling structure includes a redundant length adjusting portion T and a connector securing portion F. Five sets of reduntant length adjusting mechanisms as described above are installed into the redundant adjusting portion T. Therefore, the connection work for 200 (40×5) optical fibers at maximum can be subjected to the redundant length adjustment. The connector securing portion F includes a connector securing case 9 to which the optical connector 6 is secured, and is contained in a pulling eye 10. In addition, a tube 11 having screw members at both ends thereof is screwed between the optical cable 5 and the pulling eye 10, and the redundant length adjusting portion T is fixedly secured in the tube 11.

The storage case 11 of the redundant length treatment mechanism is fixed at such a position that the draw-out port 1a is located at the upper portion of the tube 11. The optical fiber unit 2 is drawn out through the draw-out port 1a from the storage case 1, and is secured to the connector fixing case 1 located at the lower portion of the pulling eye 10. Therefore, the alignment direction of the optical fibers in the optical fiber unit 2 can be naturally changed without applying an enforced force to the optical fiber unit 2. In this embodiment, the five ribbon fibers are laminated inside of the optical cable 5 and the storage case 1 in the arrangement structure of 8-core rows in the lateral direction and 5-core columns in the vertical direction. Therefore, the above core arrangement can be changed to a 40-core row arrangement in the lateral direction (See FIGS. 2A and 2B) which is connectable to the optical connector 6 by displacing the cores in a direction perpendicular to the ribbon surface.

The connection work of the optical connectors using the coupling member as described above will be next described with reference to FIGS. 5, 6A-6G and 7.

Figure 6A:
FIG. 6A-6G are diagrams for a series of processes for the connection work of the optical connector with the cable coupling structure to which this invention is applied.
Figure 6B:
Figure 6C:
Figure 6D:
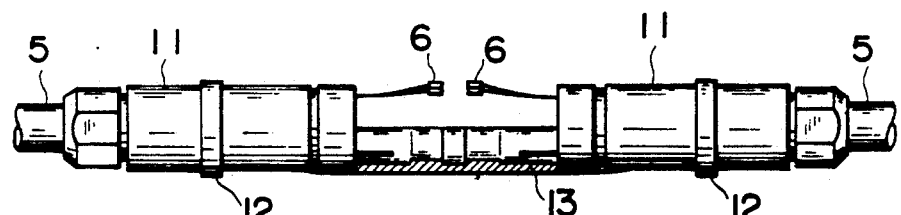
Figure 6E:
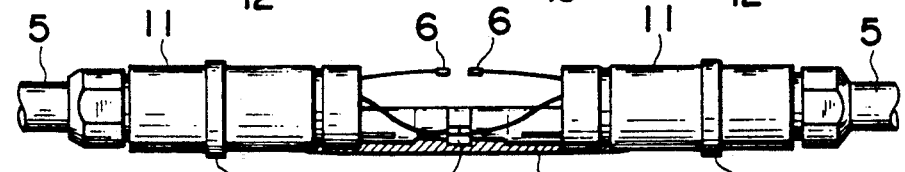

First, the pulling eye 10 is removed from the coupling structure with the end in traction (FIG. 6A), which is connected to the optical cable 5, the tube 11 and the pulling eye 10 (Step 101). When the pulling eye 10 is removed, the connector securing case fixed inside of the coupling structure is exposed to the outside as shown in FIG. 6B. Thereafter, the optical connector 6 is separated from the connector securing case 9 to remove the connector securing case 9 (Step 102). The optical connector 6 is allowed to be freely movable as shown in FIG. 6C. Thereafter, the tube 11 is inserted in an adaptor hold ring 12, and the coupling thus mounted in the adaptor hold ring 12 is confronted to another coupling structure in the same state. Subsequently, a first cable connecting adaptor 13 is secured to both of the coupling members (Step 102). This connection state is shown in FIG. 6D with a part cross-sectional view of the first cable connecting adaptor 13. Thereafter, the optical connectors, 6 are connected to each other, and stored into a pivot housing 14 as shown in FIG. 6E. In addition, the redundant part of each optical fiber unit 2 is stored into the storage case of the redundant length treatment mechanism (Step 4).

Figure 6F:
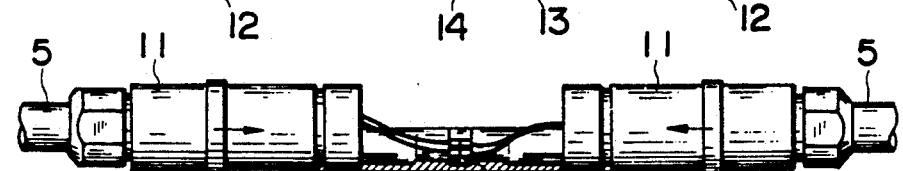
Figure 6G:
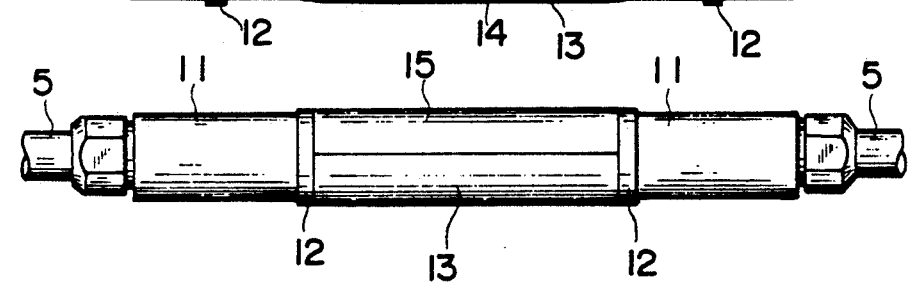
Figure 7:
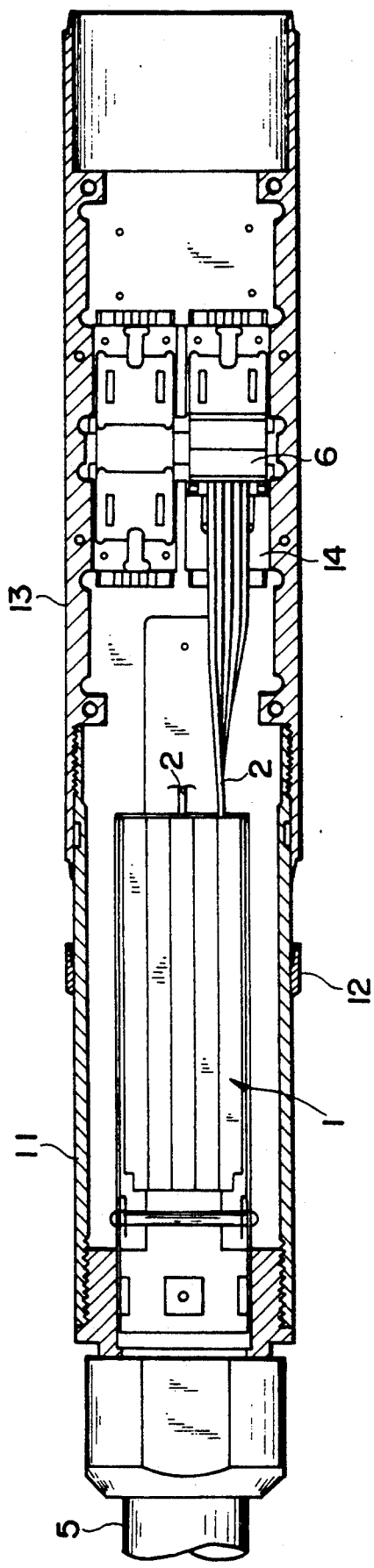
FIG. 7 is a diagram showing a state where a pivot housing supporting the optical connector is stored in the first cable connecting adaptor in the connection work of the optical connector using the cable coupling structure to which this invention is applied.

The optical fiber unit 2 which is connected to another optical connector 6 (at the right side) is omitted from the figure. A pair of optical connectors which are drawn out from the respective optical cables 5 and connected to each other are stored in each pivot housing 14. In this embodiment, five optical fiber units 2 are supplied from each optical connector 6 at maximum, and the pivot housing 14 are stored into the cable connecting adaptor 13 while laminated on one another as shown in FIG. 6F.

After the connection work for all optical connectors 6 is completed, a second cable connecting adaptor 15 is secured to the first cable connecting adaptor 13, and the adaptor hold rings 12 are slid so that the adaptor hold rings 12 are secured to the first cable connecting adaptor 13 and the second cable connecting adaptor 15 (Step 105).

According to the redundant length treatment mechanism of this embodiment, the optical connectors can be easily connected to each other, and thus the working efficiency is improved. In the embodiment as described above, the optical fiber unit comprising laminated ribbon-shaped optical fibers is used as the optical fibers, however, this invention is not limited to the above embodiment in the number, the alignment direction, the size and the structure of optical fibers.

Further, in the above embodiment, the optical fiber is looped once in the storage case, and guided to the draw-out port. However, the number of loops of the optical fiber in the storage case is not limited to 1.

Third to sixth embodiments of the redundant length treatment mechanism of this invention will be described with reference to FIGS. 8A-8B, 9A-9B, 10A-10B and 11.

The redundant length treatment mechanism of this embodiment includes a first waveform member 16, a second waveform member 17, plate springs 18 and side plates 19. The optical fiber unit 2 which is exposed from the optical cable 5 is guided along a waveform passageway W which is defined by the first waveform member 16, the second waveform member 17 and the plate springs 18, and is located in a waveform-shape (in a bent state) in the waveform passageway W.

When the optical fiber unit 2 is slackened, no external force is applied to the plate springs 18, so that the radius of curvature of the waveform passageway W becomes maximum. However, when tension is applied to the optical fiber unit 2, the plate springs 18 are urged by the optical fiber unit 2, so that the radius of curvature of the waveform passageway W is reduced by an amount corresponding to the slack amount of the plate springs 18.

Figure 9A:
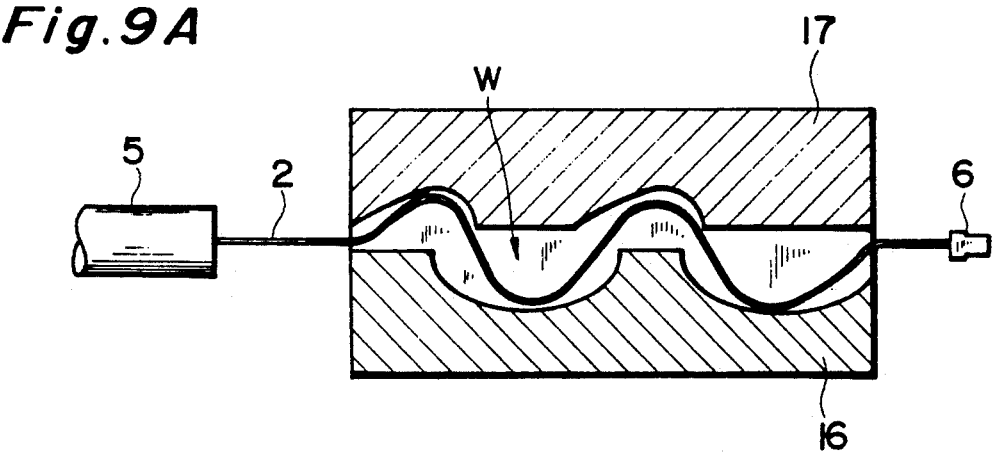
FIGS. 9A and 9B show a fourth embodiment of the redundant length treatment mechanism according to this invention.
Figure 9B:
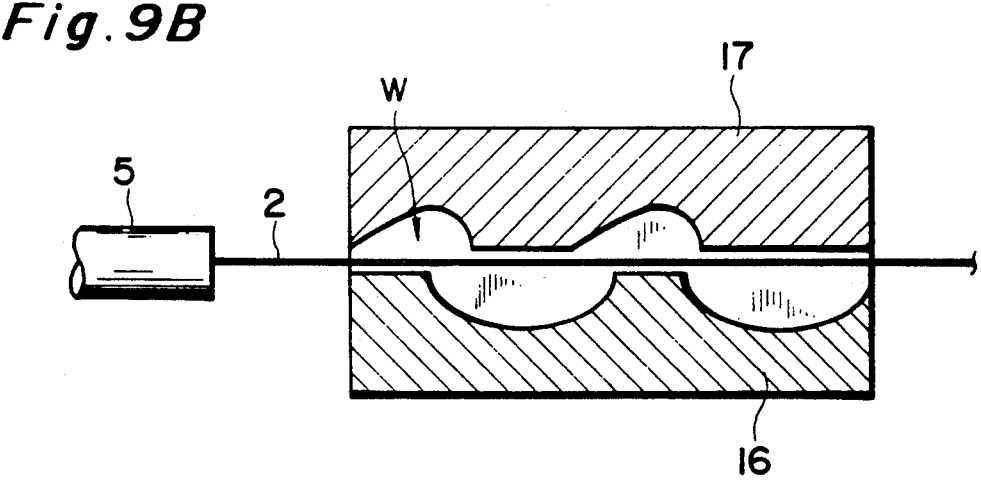

Next, the fourth embodiment of the redudant length treatment mechanism according to this invention will be explained in reference with FIGS. 9A and 9B. The different point between the fourth embodiment and the third embodiment resides in that the waveform passageway W through which the optical fiber unit 2 is guided is formed by only the first waveform member 16 and the second waveform member 17 using no plate spring. Therefore, each of the waveform members 16, 17 is designed so as to alternately have recessed and projected portions in such a manner that these recessed and projected portions of one of the waveform members are engaged with the projected and recessed portions of the other waveform member, respectively. The optical fiber unit 2 is stored in gap between the first waveform member 16, the second waveform member 17 and the side plates (not shown), and the end of the optical fiber unit 2 is connected to the optical connector 6.

In comparison with the third embodiment, this embodiment has a smaller number of parts, and also it is not required to install a different kind of material such as a plate spring, so that the fabrication of the redundant length treatment mechanism of this embodiment can be more simply performed. The first waveform member 16 and the second waveform member 17 can be manufactured with high accuracy by a resin molding.

Figure 10A:
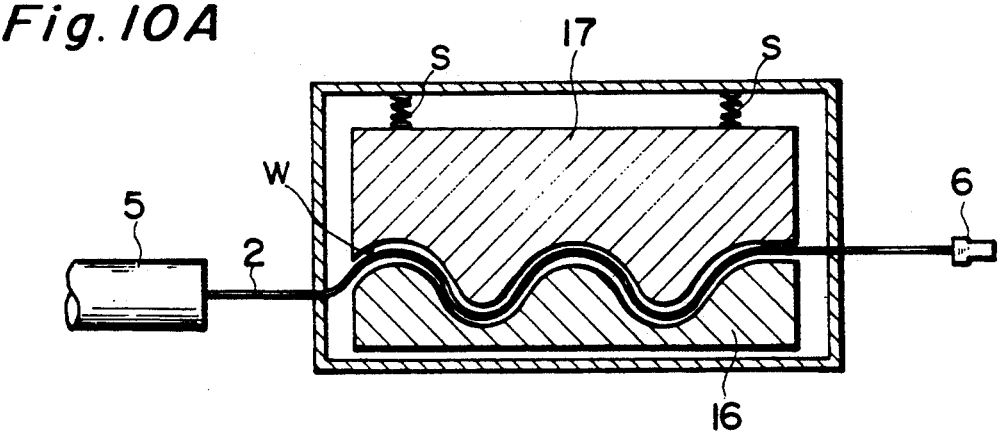
FIGS. 10A and 10B show a fifth embodiment of the redundant length treatment mechanism according to this invention.
Figure 10B:
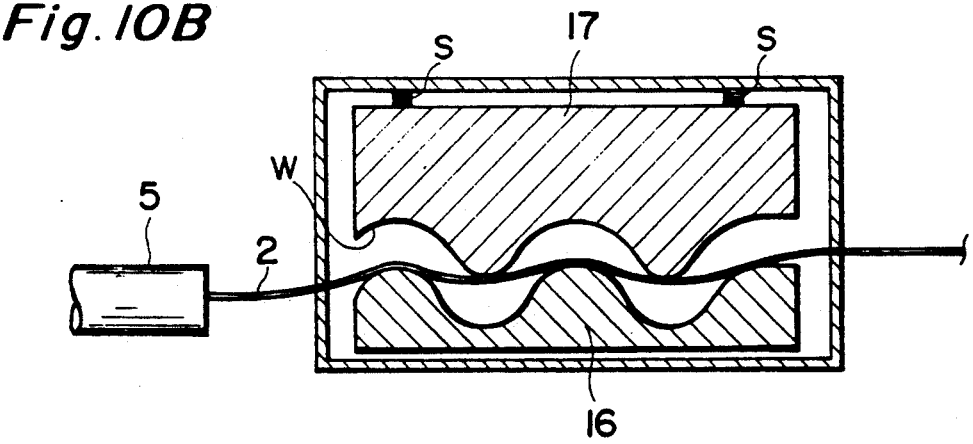

Next, the fifth embodiment of the redundant length treatment mechanism for an optical fiber according to this invention will be explained in reference with FIG. 10. The different point between this embodiment and the fourth embodiment resides in that the second waveform member 17 is urged against the first waveform member 16 by a compressed coil spring. The urging force supplied by the compressed coil spring S is sufficient to deform the optical fiber unit like waveform, but the urging force of the compressed coil spring S is weaker than tension supplied to the optical fiber unit 2. Therefore, when the optical fiber unit 2 is drawn out as occasion demands, the gap of the waveform passageway W becomes larger as shown in FIG. 10B, and the radius of curvature of the optical fiber unit 2 which is guided into the gap between the first and second waveform members 16 and 17 is increased. In this case, the optical fiber unit 2 has been drawn out by a desired amount.

In this embodiment, one of the waveform members is urged by the spring force of the compressed coil spring, however, a magnetic force or pressure may be used as an urging force.

Figure 11:
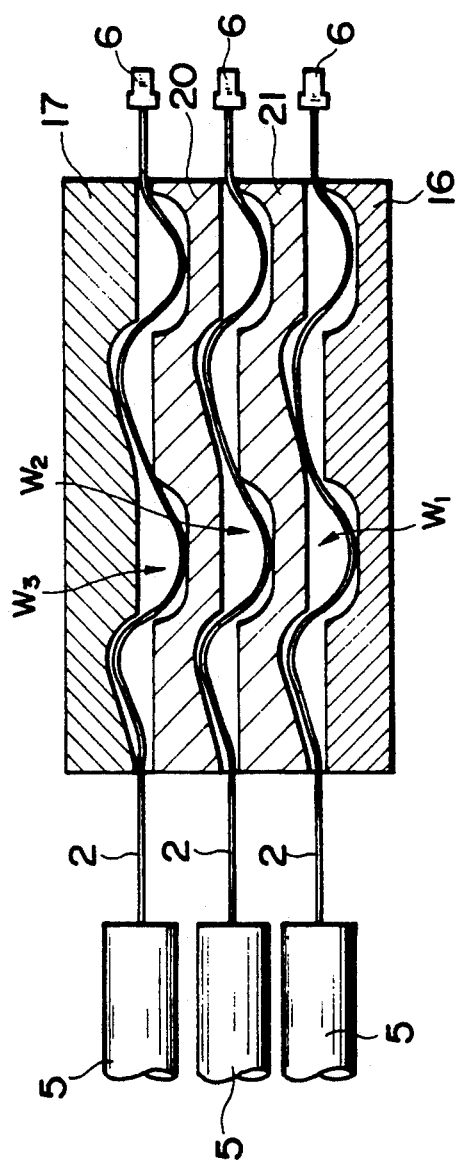
FIG. 11 shows a sixth embodiment of the redundant length treatment mechanism according to this invention.
Figure 12A:
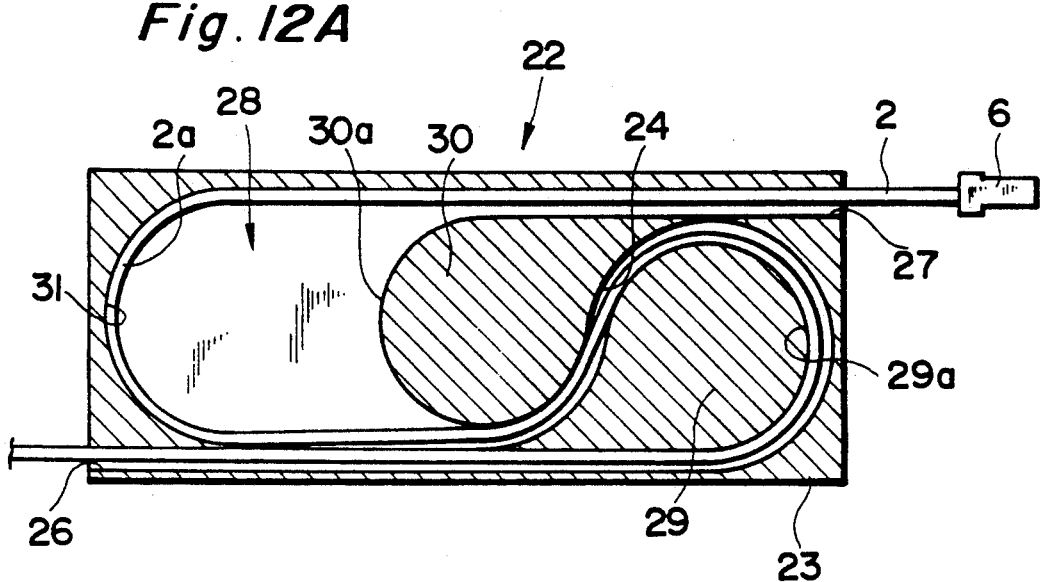
FIGS. 12A-12C shows a seventh embodiment of the redundant length treatment mechanism according to this invention.
Figure 12B:
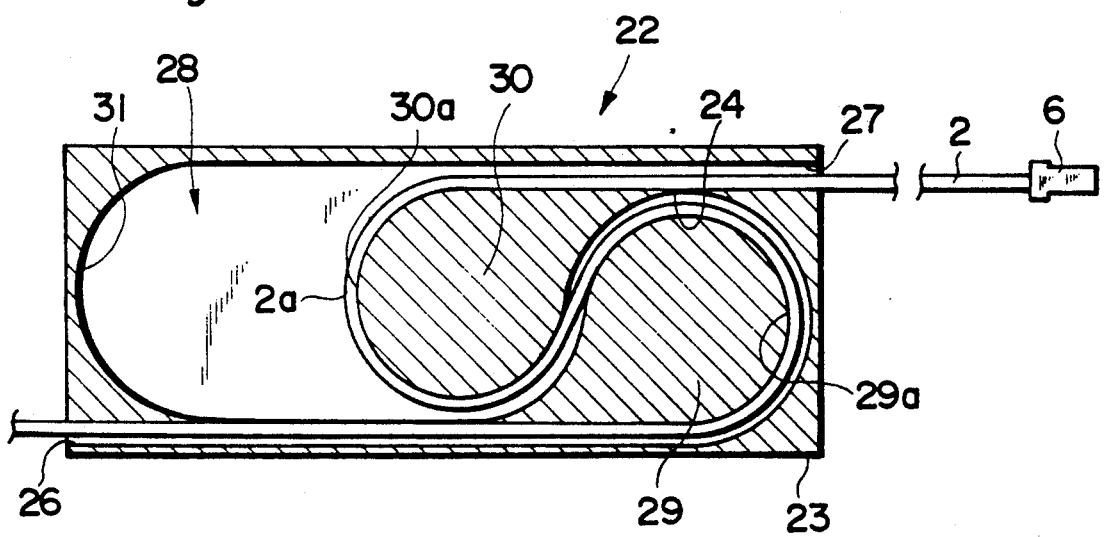
Figure 12C:
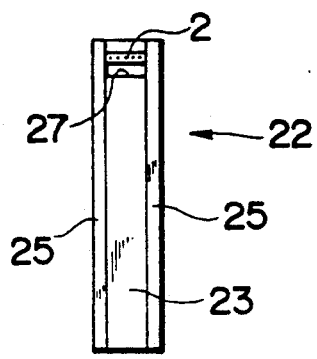

Next, the sixth embodiment of the redundant length treatment mechanism for an optical fiber according to this invention will be explained in reference with FIG. 11. The different point between this embodiment and the fourth embodiment resides in that intermediate members 20 and 21 are interposed between the first and second waveform members 16 and 17. Each of the intermediate members 20 and 21 is formed with a waved surface having the basically same profile as that of the first waveform member 16 at the upper portion thereof, and also formed with a waved surface having the basically same profile as that of the second waveform member 17 at the lower portion thereof. Therefore, the first waveform member 16 is engageable with the lower portion of the intermediate member 21 to form a first waveform passageway W1 at a gap therebetween, the upper portion of the intermediate member 20 is engageable with the lower portion of the intermediate member 20 to form a second waveform passageway W2 at a gap therebetween, and the upper portion of the intermediate member 20 is engageable with the second waveform member 17 to form a third waveform passageway W3 at a gap therebetween. An optical fiber unit 2 is arranged like waveform in each of the first to third waveform passageways W1 to W3, and the end portion of the optical fiber unit 2 is connected to an optical connector 6. When tension is applied to the optical fiber unit 2 in this state, the radius of curvature of a wave corresponding to each of the three optical fiber units 2 which are arranged between the first and second waveform members 16 and 17 is increased, and each optical fiber unit 2 is drawn out from the redundant length treatment mechanism by a desired amount.

According to the redundant length treatment mechanism of this embodiment, the optical fiber unit 2 can be easily drawn out by a desired amount (length) for the connection work of the optical connector, and a redundant part of the optical fiber unit 2 can be retracted in a gap defined by the first and second waveform members 16 and 17 and the side plates 19 after the connection work is completed.

The seventh and eighth embodiments of this invention will be next described with reference to FIGS. 12A–12C and 13A and 13B.

The redundant length treatment mechanism of this embodiment is equipped with a storage case 22, and the storage case 22 comprises a base plate 23 having a guide groove for bending the optical fiber unit 2 in an S-shape and side plates 25 disposed at both sides of the base plate 23. The base plate 23 has a predetermined board thickness, and by cutting out this board thickness portion, an inlet 26 and an outlet 27 for the optical fiber unit 2 are formed at both end sides of the base plate in the longitudinal direction, respectively. In the base plate 23, the guide groove 24 for bending the optical fiber unit 2 in the S-shape is formed between the inlet 26 and the outlet 27, and a length adjusting portion 28 for adjusting a bend-back length of the optical fiber unit 2 which is bent in the S-shape is formed at a bent portion of the S-shape between the inlet 26 and the outlet 27.

The S-shaped guide groove 24 is formed by both of projected bent surfaces 29a and 30a of arcuate first and second guide projections 29 and 30. The bend-back length adjusting portion 28 is formed between the projected bent surface 30a of the second guide projection 30 and a recessed bent surface 31 formed on the inner wall of the storage case 22 which is located so as to confront the projected bent surface 30a.

According to the redundant length treatment mechanism of this embodiment, when the optical fiber unit 2 is retracted into the storage case 22 at maximum, the bent-back portion 2a is moved so as to be contacted with the recessed bent surface 31 of the bend-back length adjusting portion 28, and the radius of curvature of the optical fiber unit 2 is restricted by the curvature of the recessed bent surface 31, so that the optical fiber unit 2 is prevented from being bent such that the bent radius of the optical fiber unit 2 is decreased over its permissible minimum bent radius.

For the connection work of the optical connector, the optical fiber unit 2 can be drawn out through the outlet 27 from the storage case 22 by a desired length. When the optical fiber unit 2 is drawn out from the storage case 22 at maximum, the bend-back length adjusting portion 28 is moved to such a position that it is contacted with the projected bent surface 30a of the second guide projection 30, and the radius of curvature of the optical fiber unit 2 is also restricted by the curvature of the projected bent surface 30a, so that the optical fiber unit 2 is prevented from being bent such that its bent radius is decreased over its permissible minimum radius.

The different point between this embodiment and the seventh embodiment resides in that plural sets of optical fiber units 2 are stored in one storage case 22a, and a redundant part of each of the optical fiber units 2 is individually adjustable in length.

In this embodiment, three sets of optical fiber units 2 are stored in a bundle in the storage case 22, and thus the S-shaped guide groove is formed more widely than that of the seventh embodiment. In addition, a bend-back length adjusting portion 28 which is formed between the projected bent surface 30a of the second guide projections 30 and the recessed bent surface 31 on the inner wall of the storage case 22 is partitioned by arcuate partition frames 32 and 33, whereby first, second and third partition portions 28a, 28b and 28c are formed in the bend-back length adjusting portion 28. Each of the arcuate partition frame 32 (33) is formed with a projected bent surfaces 32a (33a) and a recessed bent surface 32b (33b) at both side surfaces thereof.

The three sets of optical fiber units 2 are separated from one another after passed over the S-shaped guide groove 24, and individually guided to the first partition portion 28a, the second partition portion 28b and the third partition part 28c respectively. The optical fiber units 2 are bent back in the respective partition portions, and then guided through the respective outlets 27 to the outside.

Therefore, in this embodiment, the three sets of optical fiber units can be individually drawn out or retracted in through the corresponding outlets 27. In this case, the bent-back portions 2a of the respective optical fiber units 2 are moved in the first to third partition portions 28a, 28b and 28c respectively to perform the redundant length adjustment of the respective optical fiber units 2. When the bent-back portions 2a of the respective optical fiber units 2 are moved in the first to third partition portions 28a, 28b and 28c respectively, the radius of curvature of each optical fiber unit 2 is restricted by the projected bent surface portions 32a and 33a and the recessed bent surface portions 32b and 33b, and thus each optical fiber unit 2 is prevented from being bent to the extent that the radius of curvature thereof exceeds its permissible radius of curvature.

In this embodiment, the redundant parts of the three sets of optical fiber units 2 are individually subjected to the redundant length adjustment, however, the number of the sets of optical fiber units is not limited to the above embodiment.

As described above, the redundant length treatment mechanism of this embodiment is so designed that the optical fiber is retracted into the storage case in a loop form, in a bent form or in an S-shape form, so that the draw-out or retraction of the optical fiber unit can be freely carried out, and thus the working efficiency of the connection work of the optical connectors can be improved.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. A redundant length treatment mechanism for an optical fiber ribbon which is stored in an optical cable and has an optical connector connected at one end thereof, the mechanism comprising:
   a storage case in which the optical fiber ribbon, exposed from the optical cable, is stored while wound-up in a loop-shaped form, said storage case having a draw-out port through which one end portion of the loop-shaped optical fiber ribbon is drawn out; and
   curvature restricting means for restricting a radius of curvature of the optical fiber ribbon stored in the loop-shaped form in said storage case.

2. A redundant length treatment mechanism for an optical fiber ribbon as claimed in claim 1, wherein said fiber ribbon constitutes a fiber unit in which said fiber ribbon is stacked along a direction perpendicular to an end surface of said optical fiber.

3. A redundant length treatment mechanism for optical fiber ribbon as claimed in claim 1, wherein an upper portion and a lower portion of said loop-shaped optical fiber ribbon are contacted with said storage case due to rigidity of said loop-shaped optical fiber ribbon.

4. A redundant length treatment mechanism for an optical fiber contained in an optical cable and connected with an optical connector at an end thereof, the mechanism comprising:
   an optical cable having an optical fiber unit;
   a storage case storing said optical fiber unit therein, the storage case holding said optical fiber unit in a loop-shaped form, an end of said optical fiber unit being disposed outside of said storage case;
   curvature restricting means for restricting a radius of curvature of said optical fiber unit in the loop-shaped form;
   an optical connector connected to an end of said optical fiber unit;
   connector securing means for securing said optical connector;
   first holding means for holding said storage case; and
   second holding means for engaging said first holding means for holding said connector securing means.

5. A redundant length treatment mechanism for an optical fiber which is stored in an optical cable and has an optical connector connected at one end thereof, the mechanism comprising:
   a storage case in which the optical fiber, exposed from the optical cable, is stored while wound-up in a loop-shaped form, said storage case having a draw-out port through which one end portion of the loop-shaped optical fiber is drawn out; and
   curvature restricting means for restricting a radius of curvature of the optical fiber stored in a loop-shaped form in said storage case,
   said curvature restricting means comprising a pair of members which are secured to the optical fiber at front and rear sides of said draw-out port of said storage case and having a larger size than said draw-out port, so that said members are prevented from being passed over said draw-out port and, permissible maximum and minimum bend radiuses of curvature of the loop-shaped optical fiber are restricted.

6. A redundant length treatment mechanism for optical fiber as claimed in claim 5, wherein said pair of members include a first stopper and a second stopper, said first stopper being secured to said optical fiber at such a position where the minimum radius of curvature of the loop-shaped optical fiber is assured for preventing said optical fiber from being damaged due to excessive reduction of the radius of curvature of the loop-shaped optical fiber, said second stopper being secured to said optical fiber at such a position where the maximum radius of curvature of the loop-shaped optical fiber is assured for preventing said optical fiber from being damaged due to excessive increase of the radius of curvature of the loop-shaped optical fiber.

7. A redundant length treatment mechanism for an optical fiber which is stored in an optical cable and has an optical connector connected at one end thereof, the mechanism comprising:
   a storage case in which the optical fiber, exposed from the optical cable, is stored while wound-up in a loop-shaped form, said storage case having a draw-out port through which one end portion of the loop-shaped optical fiber is drawn out; and
   curvature restricting means for restricting a radius of the optical cable, is stored while wound-up in a loop-shaped form, said storage case having a draw-out port through which one end portion of the loop-shaped optical fiber is drawn out; and
   curvature restricting means for restricting a radius of curvature of the optical fiber stored in a loop-shaped form in said storage case,
   said curvature restricting means comprising a pair of members which are secured to the optical fiber at front and rear sides of said draw-out port of said storage case and having a larger size than said draw-out port, so that said members are prevented from being passed over said draw-out port and, permissible maximum and minimum bend radiuses of curvature of the loop-shaped optical fiber are restricted.

8. A redundant length treatment mechanism for optical fiber as claimed in claim 7, wherein said reel is slidable in said storage case according to the size of the loop of said loop-shaped optical fiber, an end of said loop-shaped optical fiber is connected with a string used for pulling said reel in a direction in which said radius of curvature of said optical fiber is increased.

9. A redundant length treatment mechanism for an optical fiber ribbon which is stored in an optical cable and has one end connected to an optical connector, the mechanism comprising:
   fiber bending means for bending a redundant part of the optical fiber ribbon exposed from the optical cable; and
   supporting means for supporting the optical fiber ribbon while bending the optical fiber ribbon.

10. A redundant length treatment mechanism for optical fiber ribbon as claimed in claim 9, wherein said fiber bending means include:
   a pair of waveform members arranged with gap therebetween;
   plate springs embedded in said pair of waveform members; and
   side plates encompassing said plate spring with said pair of waveform members.

11. A redundant length treatment mechanism for optical fiber ribbon as claimed in claim 10, wherein a tip end of said plate springs are bent to avoid damage to said optical fiber ribbon.

12. The redundant length treatment mechanism as claimed in claim 9, wherein said fiber bending means comprises a pair of waveform members which are disposed away from each other at an interval and have a substantially waveform shape.

13. A redundant length treatment mechanism for optical fiber ribbon as claimed in claim 12, wherein said pair of waveform members are designed so as to alternately have recessed and projected portions in such a manner that these recessed and projected portions of one of the waveform members are engaged with the projected and recessed portion of the other waveform member, respectively.

14. The redundant length treatment mechanism as claimed in claim 12, wherein one of said waveform members is urged against the other of said waveform members.

15. A redundant length treatment mechanism for optical fiber ribbon as claimed in claim 14, wherein an urging force to be applied one of said waveform members is sufficient to deform said optical fiber ribbon like waveform, but is weaker than tension supplied to said optical fiber ribbon.

16. A redundant length treatment mechanism for optical fiber ribbon as claimed in claim 14, wherein at least one intermediate member is interposed between said pair of waveform members to form a plurality of waveform passageways between said pair of waveform members.

17. A redundant length treatment mechanism for an optical fiber which is stored in an optical cable and has an optical connector connected at one end thereof, the mechanism comprising:
   a storage case in which the optical fiber, exposed from the optical cable, is stored while wound up in a substantially S-shaped form and from which one end portion of the S-shaped optical fiber is drawn out;
   fiber bending means for bending back the optical fiber in a substantially S-shaped form on the substantially same plane in said storage case; and
   bend-back length adjustment means for adjusting the length of a bent portion of the S-shaped optical fiber.

18. A redundant length treatment mechanism for optical fiber as claimed in claim 17, wherein said guide groove is formed in an S-shape with a radius of curvature larger than at least said minimum radius of curvature of said optical fiber.

19. The redundant length treatment mechanism as claimed in claim 17, wherein said fiber bending means includes an S-shaped guide groove comprising first and second guide projections, each projection having an arcuate bent surface at an outer periphery thereof, said bend-back length adjustment means being formed between a projected bent surface of said second guide projection at an outer periphery thereof and a recessed bent surface formed in said storage case so as to confront said projected bent surface.

20. A redundant length treatment mechanism for an optical fiber as claimed in claim 19, wherein said projected bent surface and said recessed bent surface are formed with a radius of curvature larger than said minimum radius of curvature of said optical fiber.

21. The redundant length treatment mechanism as claimed in claim 19, wherein said guide groove has a groove width capable of receiving a plurality of sets of optical fibers, and said bend-back length treatment means includes a plurality of partition portions into which the plurality of sets of optical fibers are individually insertable to perform an individual length adjustment for each of the optical fibers stored in each of said partition portions.

22. A redundant length treatment mechanism as claimed in claim 17, wherein said optical fiber is a fiber ribbon.

* * * * *